United States Patent [19]
Blortz et al.

[11] Patent Number: 6,110,510
[45] Date of Patent: Aug. 29, 2000

[54] PROCESS FOR PRODUCING A SEASONING SAUCE USING SMOKED PORK RIND

[76] Inventors: Doris Blortz, Nelkenstrasse 11, 74360 Ilsfeld; Hans Bohrmann, Mörikeweg 8, 74388 Talheim; Barbara Frank, Friedrich-Schmid-Strasse 9, 74223 Flein; Rudi Müller, Kurpfalzstrasse 10, 74889 Sinsheim; Richard Theobald, Am Oberen Haldenrain 2, 74348 Lauffen, all of Germany

[21] Appl. No.: 08/905,537

[22] Filed: Aug. 5, 1997

[30] Foreign Application Priority Data

Aug. 12, 1996 [DE] Germany .................. 196 32 454

[51] Int. Cl.⁷ .................................................. A23L 1/31
[52] U.S. Cl. ........................... 426/56; 426/48; 426/55; 426/589; 426/650
[58] Field of Search .................. 426/55, 56, 44, 426/46, 48, 49, 52, 62, 589, 650

[56] References Cited

U.S. PATENT DOCUMENTS

| | | | |
|---|---|---|---|
| 4,115,591 | 9/1978 | Noda et al. | 426/7 |
| 4,587,127 | 5/1986 | Akao et al. | 426/46 |
| 4,684,527 | 8/1987 | Motai et al. | 426/46 |
| 5,407,689 | 4/1995 | Müller et al. | 426/18 |

FOREIGN PATENT DOCUMENTS

| | | |
|---|---|---|
| 0724843 | 8/1996 | European Pat. Off. . |
| 25 07 788 | 9/1976 | Germany . |

OTHER PUBLICATIONS

Nakamura et al., Japanese Journal Zootech. Sci., 56: 851–859 (1985).

Tanaka, Japanese Patent Abstract 58111660.

Chae, et al. Abstract of Korean J. Food Sci., 21(5): 639–648 (1989).

*Primary Examiner*—Leslie Wong
*Attorney, Agent, or Firm*—Norris, McLaughlin & Marcus

[57] ABSTRACT

A process for producing a seasoning sauce, in which a microbial starter culture is cultured on a substrate containing an animal protein source to give a koji and is then mashed and further fermented. Soy sauce technology can be successfully carried out on an animal raw material, without the disadvantages conventionally resulting in this case occurring, if the raw material used is smoked pork rind, in particular a smoked rind residue as arises in the production of smoked ham, preferably together with a vegetable protein source and/or carbohydrate source. This provides a soy sauce having a novel flavor with a full meaty to grilled flavor.

18 Claims, No Drawings

6,110,510

PROCESS FOR PRODUCING A SEASONING SAUCE USING SMOKED PORK RIND

FIELD OF THE INVENTION

This invention pertains to seasoning sauces and processes for their production. More specifically, the invention relates to a seasoning sauce based on soy sauce technology, which has a novel, full, in particular meaty/grilled, flavor.

BACKGROUND OF THE INVENTION

Producing a fermented food from vegetable raw materials by microbial processes has long been known. In East Asia, a fermentation of vegetable raw materials has developed in which seasoning sauces are produced from soya beans (protein source) and wheat (carbohydrate source). These soy sauces are fermented in a multistage fermentation process and, including a maturation phase, the process takes up to 6 months.

The process includes a so-called solid fermentation in which a microbial starter culture is cultured on the substrate (koji phase). In this case, the fungus used, *Aspergillus oryzae* or *sojae*, produces a broad spectrum of hydrolytic enzymes which are able to digest the protein and carbohydrate-rich substrate. This digestion then proceeds in a liquid phase, which is obtained after mashing the koji in a brine solution.

For this purpose, starter cultures (e.g., osmotolerant yeasts or lactic acid formers) are sometimes added. In the further course of the process, a combined alcoholic and lactic acid fermentation takes place with subsequent maturation, in which the typical flavor profile of the soy sauce is produced.

Application of the soy sauce technology to animal raw materials has only been described occasionally, e.g., in Motai, et al., U.S. Pat. No. 4,684,527, Noda, et al., U.S. Pat. No. 4,115,591 and Akao, et al., U.S. Pat. No. 4,587,127. Nakamura et al., *Japanese Journal Zootech. Sci.* 56: 851–859 (1985), added a koji starter to veal and defatted beef, which were then fermented in salt brine.

The reason for the rarely described use of meat as a fermentation raw material is probably that animal protein alone is not a good substrate for the starter fungus. In addition, animal material is highly perishable, and the formation of components which are of toxicological concern must be expected. Acidifying the raw material in advance, for example, offers protection against a risk of infection in this case. This is described in Tanaka, Japanese Patent Abstract 58111660 by adding acetic acid to the animal protein source "fish." Animal protein is also difficult to ferment since it contains very little fermentable carbohydrates, but instead, inter alia, contains more highly perishable fat.

A simple variant of the meat fermentation is protein autolysis, which is carried out in the fermentation of fish in a salt-containing medium. In this case, no defined starters or enzymes are customarily added, but the substrate (fresh sea fish) is subjected to a natural fermentation and digested with the endogenous proteolytic enzymes. Products produced in this manner are found in East Asia. Chae, et al. describe, in the Abstract of *Korean J. Food Sci.* 21(5): 639–648 (1989), the acceleration of the production of a fish sauce by addition of koji (as enzyme source).

In order to ferment a raw material, it is conventionally broken down in a suitable manner. For this purpose, roasting, steaming or puffing (extruding) the raw materials is conventionally carried out as in Noda, et al., U.S. Pat. No. 4,115,591.

Although seasoning sauces based on soy sauce technology having a variety of flavors are known, there is still a need for seasoning sauces having novel flavors. In particular, there are currently no seasoning sauces having a full meaty to grilled flavor.

An object therefore underlying the invention is to develop a novel seasoning sauce based on soy sauce technology, which has a novel, full, in particular meaty/grilled, flavor.

SUMMARY OF THE INVENTION

The object is achieved by producing a seasoning sauce in a manner known per se using soy sauce technology, but using smoked pork rind in the fermentation as protein source. The invention thus relates to a process for producing a seasoning sauce, in which a microbial starter culture is cultured on a substrate containing an animal protein source to give a koji, and is then mashed and further fermented, characterized in that the protein source is smoked rind. The invention likewise relates to the seasoning sauces which can be produced by this process.

DETAILED DESCRIPTION OF THE INVENTION

According to the invention, it has surprisingly been found that soy sauce technology can be successfully carried out on an animal raw material, without the disadvantages described above for meat, if the raw material used is smoked pork rind, in particular a smoked rind residue as arises in the production of smoked ham.

It has been found that smoked rind alone can in principle be fermented by the organisms customary for soy sauce and that in this case a good protein digestion occurs which leads to nitrogen values ("N") which are even higher than are customary for soy sauce. In this manner, a rind liquid is obtained which has a full, rather yeasty/roasted flavor.

Although it is therefore possible to ferment the smoked rind alone and to process it to give a seasoning sauce, according to the invention it is preferred to ferment the rind analogously to a soy sauce raw material mixture, i.e., to add a carbohydrate source, such as in particular roasted wheat, wheat flour, oats, barley or bread, preferably in an amount of 40 to 140% in particular 60 to 100% (based on pork rind) to the protein source (rind). This gives a seasoning liquid with a rounded improved flavor, having a somewhat smoky character. The carbohydrate component supplies sugar during the fermentation, which, on the one hand, can be fermented by yeasts, but, on the other hand, can also be metabolized by lactic acid bacteria. Both give the end product a typical aroma and a slightly acidic pH. Owing to the fact that the pH is decreased to the slightly acidic range (pH less than 5.6) during the fermentation of the smoked rind, the risk of bacterial spoilage is reduced.

Surprisingly, a decrease in pH and an improvement of the flavor of such a seasoning sauce based on smoked pork rind can be achieved not only by adding a carbohydrate source to the smoked pork rind, but a pH reduction during the fermentation and an improvement in flavor is also observed if, instead of cereal or cereal products, a legume protein, such as soya, rapeseed or sweet lupin, is used together with the rind as raw material mixture.

This was not to be expected, since these legumes do not have conventional starch carbohydrates, but nonstarch polysaccharides and fibre are present, in addition to the protein as principal component. Apparently, these can participate in a lactic fermentation to the extent that a certain pH reduction occurs. However, in contrast to cereal raw material in this case, no significant alcoholic fermentation (to a small extent in the case of rapeseed) with osmotolerant yeast can proceed (as, obviously, does not occur either when rind alone is fermented). The combination of the rind with both cereal raw materials and legumes is particularly preferred and leads to seasoning liquids with a novel flavor having a meaty/grilled character.

A vegetable protein source is preferably added in an amount of 40–140%, in particular 60–100% (based on pork rind).

According to the invention, the smoked pork rind can be fermented using starter cultures traditionally used only for vegetable material, analogously to a soy sauce, the rind, preferably that which arises as residue in the production of smoked ham, being able to be broken down by a partial defatting, mechanical comminution, and by a thermal treatment (cooking or steaming in combination with presteeping). This pretreatment serves to set an optimal water content for the solid fermentation (approximately 50% moisture is expedient). Preference is also given to a microwave puffing of the rind in a known manner.

In the preferred embodiment, in which the rind is fermented in a mixture with a vegetable carbohydrate source and/or protein source, the pH surprisingly rapidly decreases to the acidic pH range, so that the product is microbiologically stabilized without having to be acidified. As protein source and carbohydrate source, use can be made of stale bread, oat grains, pearl barley, wheat grains, sweet lupin seeds, defatted rape meal or soya meal. Prior to the solid fermentation, these are conditioned in a conventional manner by steeping to the suitable water content (approximately 40 to 50%) and are then sterilized by boiling or steaming. The wheat grains can also be slightly roasted with hot air for the pretreatment.

The addition of the carbohydrate source or protein source to the rind even in the solid fermentation for koji production in an amount of 40 to 140% (based on pork rind) is also particularly advantageous because it improves the growth of the Aspergillus starter. Furthermore, preferably in the case of starch-containing raw materials, or in the case of raw materials such as rapeseed which contain small amounts of fermentable oligosaccharides, this makes a yeast fermentation possible, which occurs after addition of an osmotolerant yeast, e.g., Zygosaccharomyces rouxii, to the fermentation mash and thus rounds off well the aroma of the seasoning liquid.

The fermentation is continued, as is known for soy sauce, by mashing the koji in salt water. The procedure can be followed in this case as is described in Muller, et. al., U.S. Pat. No. 5,407,689. It is advantageous to carry out the mashing at a reduced salt content (5 to 10%) in order to decrease the fermentation time (in comparison with standard soy sauces). The temperature conditions during the fermentation phases can be selected as are described in U.S. Pat. No. 5,407,689. The addition of an osmotolerant starter yeast, such as Zygosaccharomyces rouxii, to the mash is preferred in order to obtain a particularly rounded flavor in the product. A lactic acid fermentation does not occur in a natural manner in the batches of the invention, so that although addition of a lactic acid starter is possible, it is preferably omitted. Fermentation of the mash including maturation takes 7 to 10 weeks.

The mature mash is, as is conventional in soy sauces, separated off from the residue by filtering on a filter press, pasteurized and, if appropriate, clarified by membrane filtration. Any fat floating in the mash is preferably simply skimmed off in advance, but it does not interfere with the course of the fermentation. The seasoning liquids obtained have a balanced grilled/meaty taste, are savory and have only a little smoked character.

Analytically, the seasoning liquids have a considerable nitrogen content of generally 1.3 to 2.1%, and an amino nitrogen/total nitrogen ratio which is preferably greater than 0.5. The degree of hydrolysis in the case of glutamic acid (MSG) is generally greater than 60%, free amino acids occurring being principally glycine, proline and glutamic acid. The seasoning liquids contain very little bitter-tasting arginine. With regard to the flavor profile, completely novel savory seasoning liquids having an original character are therefore obtained, which may be compared neither with soy sauce nor with fish sauce.

The examples illustrate the invention, and are not meant to be limiting in any way. All percentages in examples and description are by weight.

EXAMPLE 1

1 kg of partially defatted, smoked and cooked Black Forest ham rind (water content 45%, fat content 12%, protein content 36% (N*5.8, i.e., calculated by multiplying the nitrogen content by 5.8) is coarsely cut. 1 kg of sweet lupin of the cultivar Minori (coarsely ground, protein content 32%) is steeped for three hours at room temperature. The water absorption is 115%. The two raw materials are mixed and autoclaved in a thin layer on a sieve-bottom plate for 15 min at 121° C. The sterile substrate is inoculated with 100 ml of a 10% strength Aspergillus oryzae spore suspension (fungal starter No. 1863 from the Deutsche Stammsammlung für Mikroorganismen, Braunschweig). The starter was obtained from koji powder, which was obtained by solid fermentation of the starter on an oat/barley substrate.

The inoculated material is incubated for 50 hours at 30° C. in an incubation cabinet having a high atmospheric humidity (greater than 95% humidity) until a thick white mycelial lawn has penetrated through the substrate (termed koji). The koji is mashed with a 10% strength salt solution in a ratio of 1:1.5 and initially fermented at 30° C. for four days, then at 40° C. for two weeks. To the mash is then added the sediment from the inoculated flask of the osmotolerant yeast Zygosaccharomyces rouxii (likewise obtained from the DSM), which had been preliminarily cultured in a yeast extract—peptone—liquid medium containing 5% salt. The mash is fermented for a further 2 weeks at 30° C. and this is followed by a 2–4 week maturation phase at room temperature. During the fermentation, very little ethanol and very little glycerol (yeast metabolic products) are formed, but 0.5% lactic acid is formed.

The mature mash liquid is pressed on a fruit press (with inserted filter cloth) and is then briefly boiled (5 min). The seasoning liquid obtained is clarified by a microfiltration (0.1 μm exclusion). It has a DM of approximately 18% and a pH of 5.4; the nitrogen content is 1.5% and the degree of hydrolysis (calculated as ratio of free to bound MSG) is just under-70%.

The results of Example 1 are summarized in Table 1.

EXAMPLE 2

Example 1 is repeated, with the modification that instead of lupins, 1 kg of rapeseed meal (available under the tradename 00 CULTIVAR) having a protein content of approximately 35% is added together with 1 kg of ham rind from Example 1.

The water absorption of the steeped rapeseed is 70%. During the fermentation, very little ethanol is formed, but glycerol and lactic acid are formed. A seasoning liquid is obtained having 19% DM and a nitrogen content of 1.5%; the pH is 5.1.

The seasoning liquid is then partially concentrated in a known manner. The physical data of the partially concentrated seasoning liquid are listed in Table 1.

EXAMPLE 3

Example 1 is repeated, with the modification that, instead of lupins, 1 kg of stale bread is added, together with 1 kg of ham rind from Example 1. During the fermentation, considerable amounts of ethanol (approximately 3%) and glycerol are formed, but also approximately 0.5% of lactic acid is formed. A seasoning liquid is obtained having 19% DM and 1.3% N having a pH of 5.1. The results are summarized in Table 1.

EXAMPLE 4

Example 1 is repeated, with the modification that, instead of lupins, 1 kg of oats is used, together with 1 kg of ham rind from Example 1. The results are summarized in Table 1.

EXAMPLE 5

Example 1 is repeated, with the modification that there is no further addition of raw material, but instead of 1 kg of ham rind and 1 kg of sweet lupins, 2 kg of ham rind from Example 1 are used. The results are summarized in Table 1.

EXAMPLE 6

Example 5 is repeated, with the modification that in the further fermentation, no starter yeast is added. During the fermentation, neither ethanol nor glycerol is formed, but no lactic acid is formed either, and the pH remains in the neutral range. No acid is added to decrease the pH range. The seasoning liquid obtained has a pH of 7.6, but does not have a bad or rotten taste. The DM content is 19%, the nitrogen content is 1.95%. The results are summarized in Table 1.

EXAMPLE 7

Example 1 is repeated, with the modification that, instead of lupins, 1 kg of defatted soya meal (44% protein content) is used, together with 1 kg of ham rind from Example 1. The water absorption of the swollen soya meal is 70%. During the fermentation, no ethanol or glycerol is formed, but 0.5% lactic acid is formed. The results are summarized in Table 1.

The invention now being fully described, it will be apparent to one of ordinary skill in the art that many changes and modifications can be made thereto without departing from the spirit or scope of the invention as set forth herein.

TABLE 1

| Addition to fermentation | Example 1 | Example 2 | Example 3 | Example 4 |
|---|---|---|---|---|
| Brix° | 22.4 | 41.8 | 23.6 | 25.3 |
| DM % | 18.0 | 36.6 | 18.7 | not determined |
| NaCl % | 5.4 | 9.3 | 6.0 | 7.1 |
| pH | 5.4 | 5.1 | 5.1 | 5.1 |
| Color value 5% strength | 0.128 | 0.334 | 0.172 | 0.187 |
| Total N % | 1.52 | 2.83 | 1.31 | 1.36 |
| MSG before hydrolysis % | 1.21 | 1.98 | 0.71 | 0.81 |
| MSG after hydrolysis % | 1.65 | 2.98 | 1.53 | 1.38 |
| Glucose g/l | not detectable | not detectable | 0.60 | 1.00 |
| Lactic acid g/l | 5.0 | 13.0 | 5.0 | 10.0 |
| Ethanol g/l | 0.20 | 0.10 | 27.30 | 7.00 |
| Glycerol g/l | 2.0 | 5.0 | 11.0 | 7.0 |
| Sensory characteristics | great fullness, strong slightly smoky fermentation character | mild, full neutral has a base character | mild, neutral slightly grilled quality slightly roasted quality full | neutral flat grilled-meaty slightly roasted |

| Addition to fermentation | Example 5 | Example 6 | Example 7 |
|---|---|---|---|
| Brix° | 22.8 | 23.0 | 28 |
| DM % | 18.6 | 19.1 | 24.1 |
| NaCl % | 6.0 | 6.1 | 6.3 |
| pH | 7.8 | 7.6 | 5.6 |
| Color value 5% strength | 0.282 | 0.553 | 0.316 |
| Total N % | 2.10 | 1.96 | 2.05 |
| MSG before hydrolysis % | 0.86 | 0.90 | 1.6 |
| MSG after hydrolysis % | 1.49 | 1.40 | 2.5 |
| Glucose g/l | not detectable | not detectable | not detectable |
| Lactic acid g/l | 1.0 | 1.0 | 4 |
| Ethanol g/l | not detectable | not detectable | not detectable |
| Glycerol g/l | not detectable | not detectable | not detectable |
| Sensory characteristics | odor of yeast and fermentation rind not recognizable, full, strong | | Fermentation note, slightly roasted, somewhat sharp |

We claim:
1. A process for producing a seasoning sauce, comprising:
   (a) culturing a microbial starter culture on a substrate comprising an animal protein source in the form of a smoked pork rind and a carbohydrate source in an amount 40% to 140% of the smoked pork rind to make a koji,

(b) mashing said koji, and (c) fermenting said koji after mashing.

2. The process according to claim 1, wherein said starter culture is a fungal starter for soy sauces selected from the group consisting of *Aspergillus oryzae* and *sojae*.

3. The process according to claim 1, wherein said substrate further comprises a vegetable protein source.

4. The process according to claim 3, wherein said vegetable protein source is added to said smoked pork rind in an amount of 40 to 140% based on smoked pork rind.

5. The process according to claim 3, wherein said vegetable protein source is a legume protein.

6. The process according to claim 1, wherein said carbohydrate source is selected from the group consisting of oats, wheat, barley or bread.

7. The process according to claim 1, wherein, after mashing the koji, an osmotolerant yeast is added to the mash.

8. The process according to claim 3, wherein said vegetable protein source is added to the smoked pork rind in an amount of 60 to 100% based on smoked pork rind.

9. The process according to claim 1, wherein said carbohydrate source is added to the smoked pork rind in an amount of 60 to 100% based on smoked pork rind.

10. The process according to claim 5, wherein said legume protein is selected from the group consisting of soya, rapeseed or sweet lupin.

11. The process according to claim 7, wherein said osmotolerant yeast is Zygosaccharomyces rouxii.

12. A process for producing a seasoning sauce, comprising:

(a) culturing a microbial starter culture on a substrate comprising an animal protein source in the form of a smoked pork rind, a carbohydrate source in an amount 40% to 140% of the smoked pork rind, and a vegetable protein source to make a koji, (b) mashing said koji, and (c) fermenting said koji after mashing.

13. The process according to claim 12, wherein said starter culture is a fungal starter for soy sauces selected from the group consisting of Aspergillus oryzae and sojae.

14. The process according to claim 12, wherein said vegetable protein source is a legume protein.

15. The process according to claim 12, wherein said carbohydrate source is selected from the group consisting of oats, wheat, barley and bread.

16. The process according to claim 12, wherein, after mashing the koji, an osmotolerant yeast is added to the mash.

17. The process according to claim 14, wherein said legume protein is selected from the group consisting of soya, rapeseed and sweet lupin.

18. The process according to claim 16, wherein said osmotolerant yeast is *Zygosaccharomyces rouxii*.

* * * * *

UNITED STATES PATENT AND TRADEMARK OFFICE
CERTIFICATE OF CORRECTION

PATENT NO. : 6,110,510
DATED : August 29, 2000
INVENTOR(S) : Blortz et al.

It is certified that error appears in the above-identified patent and that said Letters Patent is hereby corrected as shown below:

<u>Title page,</u>
Insert -- Assignee: Bestfoods, Englewood Cliffs, N.J. --

Signed and Sealed this

Twenty-ninth Day of January, 2002

Attest:

JAMES E. ROGAN
*Attesting Officer*   *Director of the United States Patent and Trademark Office*